United States Patent [19]

Krofta

[11] Patent Number: 5,145,582
[45] Date of Patent: Sep. 8, 1992

[54] METHOD FOR STABILIZING SLUDGE

[75] Inventor: Milos Krofta, Lenox

[73] Assignee: Lenox Institute for Research, Inc., Lenox, Mass.

[21] Appl. No.: 616,789

[22] Filed: Nov. 21, 1990

Related U.S. Application Data

[62] Division of Ser. No. 320,400, Mar. 8, 1989, Pat. No. 5,013,429.

[51] Int. Cl.$^5$ .............................................. C02F 11/12
[52] U.S. Cl. .................................. 210/609; 210/631; 210/760
[58] Field of Search ............... 210/609, 613, 760, 614, 210/620, 627, 629–631

[56] References Cited

U.S. PATENT DOCUMENTS

| | | | |
|---|---|---|---|
| 1,994,887 | 3/1935 | Downes et al. | 210/8 |
| 2,137,966 | 11/1938 | Rankin | 210/2 |
| 3,649,531 | 3/1972 | Brown et al. | 210/609 |
| 3,886,073 | 5/1975 | Briltz | 210/136 |
| 3,961,078 | 6/1976 | Stitt | 210/609 |
| 4,377,486 | 3/1983 | Barrick et al. | 210/609 |
| 4,464,257 | 8/1984 | Lynch et al. | 210/195.1 |
| 4,500,428 | 2/1985 | Lynch et al. | 210/609 |
| 4,576,719 | 3/1986 | Hurley et al. | 210/609 |
| 4,581,137 | 4/1986 | Edwards | 210/220 |
| 4,652,382 | 3/1987 | Edwards et al. | 210/752 |
| 4,695,388 | 9/1987 | Long, Jr. | 210/760 |

Primary Examiner—Thomas Wyse
Attorney, Agent, or Firm—Wolf, Greenfield & Sacks

[57] ABSTRACT

An apparatus and method for stabilizing sludge such as the sludge produced by municipal waste water treatment plants includes thickening of the sludge to a dry solid content in the range of 3% to 8% before feeding it to at least one comparatively small reactor tank that extends horizontally and has an inlet and outlet adjacent opposite end walls. The system preferably utilizes multiple tanks stacked one above the other and connected in series. The tanks have an in-built mixer that sweeps through the interior of the tank. The mixer is eccentrically mounted so that its mixing members carry the sludge through the uppermost portion of the tank interior and are spaced from the bottom surface of the tank. A sparger is located either in the inlet or in the bottom clearance of the tank to introduce microscopic bubbles of oxygen and ozone into the sludge. A pressure regulating valve controls the flow of the stabilize sludge from the uppermost reactor tank. The pressure regulating valve and the metering pump together maintain a hyperbaric pressure within the tanks.

7 Claims, 2 Drawing Sheets

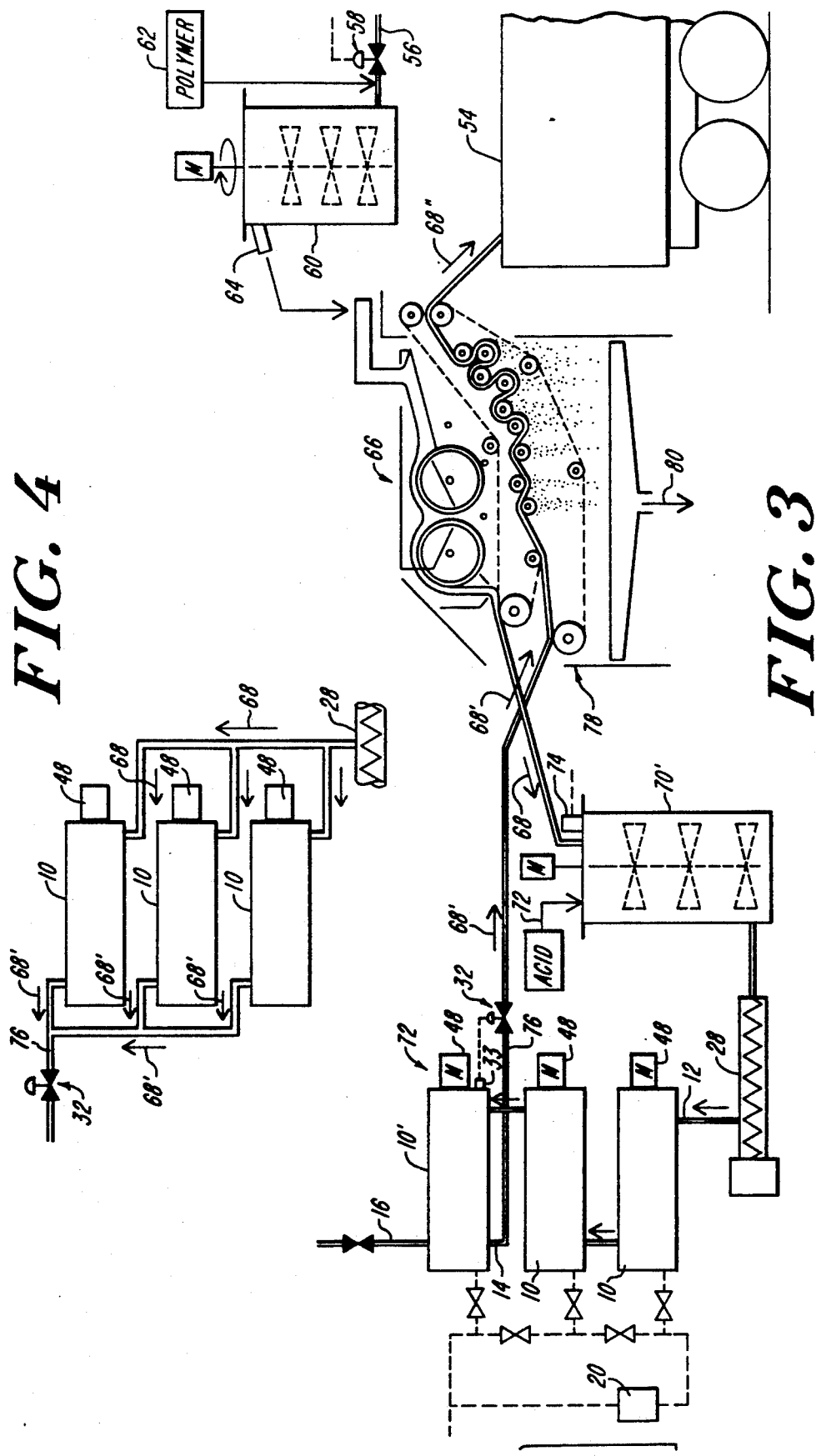

METHOD FOR STABILIZING SLUDGE

This application is a division of application Ser. No. 07/320,400, filed Mar. 8, 1989, now U.S. Pat. No. 5,013,429.

BACKGROUND OF THE INVENTION

This invention relates in general to apparatus and methods for the stabilization of sludge such as sludge formed during the treatment of municipal waste water. More specifically, it relates to an apparatus and method where the sludge is intensively mixed with microscopic bubbles of oxygen and ozone in one or more reaction tanks each having an in built mixer.

The disposal of sludge produced by waste water treatment plants is an increasingly difficult problem. In recent years the problem is intensifying on the supply side as the population grows and there is an increased emphasis on the treatment of waste water to meet pollution control standards. On the disposal side, landfill sites are becoming less available, or available only if the sludge is transported over longer distances at an increased cost. Heretofore, a principal disposal technique was ocean dumping. However, ocean dumping has been found to have an adverse environmental impact and is scheduled to be totally phased out, at least in the United States, in the near future.

Other known disposal techniques for sludge include burning it, particularly at large centralized incinerators, and using it as a fertilizer or a mulch for agricultural applications. The burning of sludge at present produces a variety of air pollution problems, particularly since sludge typically contains high concentrations of heavy metals. The heavy metal content and the presence of harmful bacteria and other organic matter seriously limits the use of sludge for agricultural purposes. In addition, conventional treatment methods result in the sludge product, even one where heavy metal content is controlled and the sludge is otherwise stabilized, that has a high water content and therefore is heavy and expensive to transport.

To disinfect sludge, it has been known for some time that it may be treated with ozone and/or oxygen. For example, D. Thiirumirthi discloses the application of ozone for waste water treatment in *Water and Sewerage Works* (1968) at page R-106. Further, as early as 1971 H. M. Rosen made a presentation at the University of Wisconsin relating to the application of ozone to the treatment of sludge. It is also known to adjust the pH of the sludge to remove heavy metals.

U.S. Pat. Nos. 3,525,685; 3,772,188; and 4,581,137 to R. N. Edwards describe various ways to use oxygen and ozone to treat sewer lines, municipal sewerage, and liquid sludge. U.S. Pat. Nos. 4,464,257 and 4,500,428 to J. M. Lynch disclose a similar system for treating sludge in several hyperbaric reaction vessels with the use of intermediate sludge thickening devices.

U.S. Pat. Nos. 3,772,118 and 4,581,137 to Edwards describe apparatus for treating municipal sewerage with oxygen and ozone gas in a large spherical, stainless steel reactor vessel. The sludge fills the vessel approximately halfway. An oxygen diffuser, an improved version of which is subject of the '137 patent, diffuses the oxygen and ozone gases into the liquid sewerage at the bottom of the reactor vessel. To interact the sewerage and the gas, the liquid sewerage is directed by a pump and pipes to the upper end of the vessel where it is discharged against a rotating commutator that breaks up the sewerage into droplets which are deflected downwardly through the upper half of the vessel toward a pool of sewerage held in its bottom half. The sewerage interacts with the oxygen and ozone gases that fill the upper half of the vessel. The droplet to-gas contact surface area and reaction time are not conducive to a rapid and complete stabilization of the sludge, e.g. in one spraying. The gas also interacts with the sewerage through direct diffusion into the sewerage pool because the diffuser is submerged within the sewerage at the bottom of the vessel, but this additional gas sludge interaction does not, in practice, sufficiently enhance the performance characteristics of the Edwards type apparatus to a level that is comparable with that achievable with the present invention.

In U.S. Pat. Nos. 4,464,257 and 4,500,428 to Lynch et al., the sewerage interacts with oxygen and ozone gas in much the same manner as in Edwards. Lynch et al. use a large closed vessel with a sludge disperser mounted within the vessel that sprays watery sludge into an open part of the vessel filled with ozone and oxygen or air. A pump and recycling piping directs the watery sewerage from the bottom of the vessel to the top where it is then directed to the spray disperser Lynch also teaches adding chlorine to enhance oxidation, but at a substantial cost disadvantage. The pH is adjusted by adding sulphuric acid to the sludge held in the tank. Lynch also teaches an oxygen diffuser located near the bottom of the reaction vessel at its interior. It is significant to note that the reaction time to achieve stabilization for both Edwards and Lynch is comparatively long. In the '137 patent, Edwards mentions a 90 minute cycle of reaction. Lynch et al. mention residence times of 15-60 minutes in each of two reaction vessels which operate on the sewerage, one after the other.

While both the Edwards and Lynch systems are capable of producing a stabilized sewerage end product, the systems are costly, comparatively slow, operate in a batch mode, should have an attendant to monitor their operation, and require that the sludge or waste sewerage being processed be in a liquid state capable of being sprayed within the reaction Vessel. For municipal waste water treatment sludge, being in a liquid phase capable of being sprayed means having a dry solid content of about 1% to 3%.

Therefore a principal object to the present convention is to provide a highly compact sludge stabilization apparatus and method which has a comparatively low capital cost and can be operated fully automatically on a continuous basis to produce a treated sludge product that is not biologically dangerous and has removed from it potentially hazardous heavy metals.

Another principal object of the present invention is to provide a sludge stabilization apparatus and method with the foregoing advantages which can treat sludge in a thickened phase with a dry solid content in excess of 3%.

Yet another principal advantage of the present invention is to provide a sludge stabilization apparatus and method with all the foregoing advantages which has a reaction period which is several times faster than known prior art apparatus and techniques.

A further object of the invention is to provide a system for stabilizing sludge which results in a comparatively inert, heavy metal free sludge which has a dry solid content of approximately 20% to 40%, with attendant lower weight and lower transportation costs.

A still further object of the present invention is to provide a sludge stabilization apparatus and method which can turn normal municipal waste sludge into products which can be used as a fuel or for agricultural purposes such as fertilizer or mulch.

Still other objects of the present invention are to provide sludge stabilization apparatus and method which utilize reactor tanks that can be approximately ¼ of the size of reactor tanks in prior art systems capable of handling equivalent volumes of sludge, which utilize conventional piping and which avoid the cost, safety testing, and safety hazards of known prior art sludge stabilization systems which pump the sewerage at high pressures for spraying.

SUMMARY OF THE INVENTION

The sludge stabilization and apparatus and method of the present invention operate on thickened sludge having a dry solid content in the range of approximately 3% to 8%. This comparatively thick sludge is treated in a reactor tank having an in-built mixer, preferably one which is driven to rotate by a dedicated gearmotor. Microscopic bubbles of oxygen and ozone gas or oxygen-bearing gas and ozone are diffused into the sludge, at an inlet to the tank, using a sparqer located at the bottom portion of the tank, or using a combination of both of these approaches. The mixer is mounted eccentrically so that it clears a bottom-mounted sparqer while also carrying the sludge to the uppermost portions of the interior of the reactor tank where the diffused gases would otherwise tend to accumulate. The mixer preferably has a shaft that extends parallel to the longitudinal axis of a horizontally oriented reactor tank having a generally circular cross-section. The mixer also preferably has four equiangularly spaced, radially extending plates that are mounted on the shaft. As the shaft is rotated, the plates sweep through substantially the entire interior volume of the reactor tank, with the exception of a small clearance space at the bottom of the tank occupied by the sparger. The mixer plates include openings to allow the passage of the sludge and diffused gas contained in the sludge to pass therethrough. Rotation of the mixer, typically at 100 to 200 rpm, produces an intensive mixing of the sludge and the microscopic gas bubbles which increases the contact between the bubbles and the sludge and reduces the reaction time necessary for stabilization.

The tank has an inlet which feeds the tank at a lower wall portion near one end of the tank and an outlet located at the opposite end of the tank. In one form the tanks are connected in parallel to provide an enhanced processing capability, but with a shorter reaction time for the stabilizer to act on any given portion of the sludge being treated. In another preferred form, a plurality of tanks are connected in series and stacked vertically-, one above the other, with the outlet from one tank feeding directly to an inlet of the immediately adjacent overlyinq tank. If such a vertical stack is used, the outlet on the uppermost tank is also located at the bottom portion of the tank and a vent is provided at the upper region of the upper tank to release accumulated gases. The flow of sludge through the reactor tank or tanks of the present invention is controlled to maintain a hyperbaric pressure, typically 3 to 8 bars, and preferably by providing a metering pump to feed the inlet of the first tank and a regulating outlet valve in the final outlet line.

Viewed broadly as a process, the present invention involves prethickening municipal waste water sludge to a solid content in the range of approximately 3% to 8% and acidifying the sludge to a pH value which results in the removal of heavy metals from the sludge. This acidified and prethickening sludge is then fed at a controlled rate to at least one reactor vessel where microscopic bubbles of oxygen and ozone gas are infected into the sludge and an inbuilt mixer that is eccentrically mounted intensively mixes the sludge and gas bubbles. The process also includes withdrawing the stabilized sludge from the tank at a controlled rate to maintain a hyperbaric pressure within the tank of 3-8 bars.

Viewed as a system, whether in apparatus or method form, the present invention include a first mixer or mixing step which utilizes a polymer admixed to the liquid sludge received from a settling tank or flotation type clarifier to produce a mixture which is fed to a reducer that removes sufficient water from the polymer-treated and mixed sludge to produce a prethickened sludge with a dry solid content in the range of approximately 3% to 8%. The prethickened sludge is then directed to a second mixer or mixing step where acid is added to the prethickened sludge to adjust its pH level to one which will remove heavy metals from the sludge. A metering pump or other flow regulating means then directs the acidified and prethickened sludge to one or more reaction tanks comprising a sludge stabilization system constructed and operated as described above. Then stabilized sludge is withdrawn from the stabilizer to a second thickening apparatus or process step, such as a conventional twin belt press, which reduces the water content of the sludge until it has a dry solid content in the range of 20% to 40%. This dried and stabilized sludge can then be directed from the thickener directly to a truck or other transportation container for disposal or further processing. The end product is also suitable for use as a fuel, either to be burned directly as briquets or for gasification to operate a diesel engine which provide electrical power on-site or at an off-site location.

These and other features and objects of the invention will be fully understood from the following detailed description of the preferred embodiments which should be read in light of the accompanying drawings.

BRIEF DESCRIPTION OF THE DRAWINGS

FIG. 3 is a schematic diagram illustrating a full apparatus and method according to the present invention for treating liquid waste water sludge to produce a highly dried and stabilized sludge product which utilizes as one component of the system the stabilization reactor shown in FIGS. 1 and 2; and FIG. 4 shows a stabilization reactor of the type shown in FIGS. 1-3 except that the individual reactor tubes are connected in parallel.

DETAILED DESCRIPTION OF THE PREFERRED EMBODIMENTS

Figure 1:
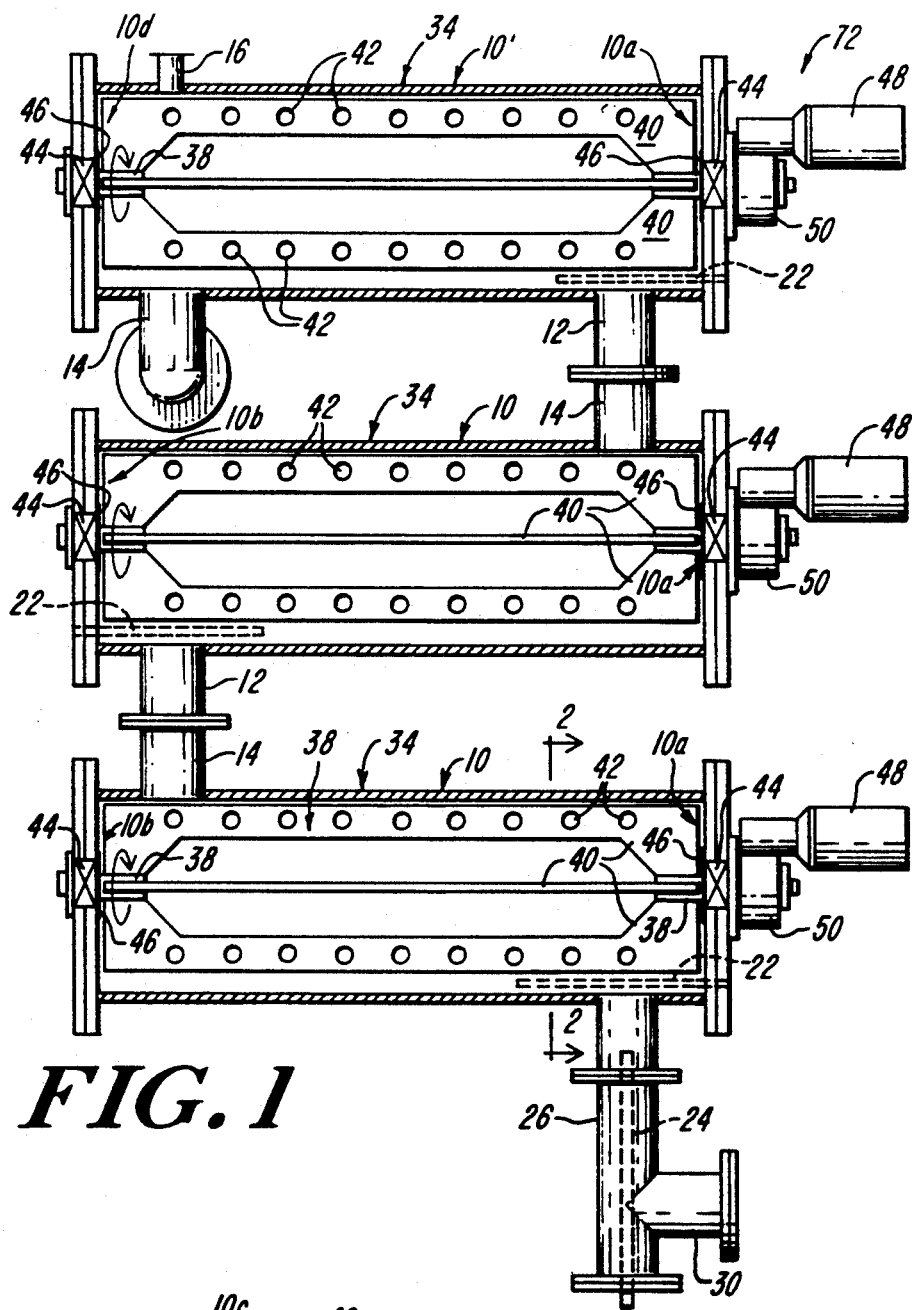
FIG. 1 shows a stabilization reactor formed by a series connected vertical stack of reaction tanks with in built, eccentrically mounted mixers and individual gearmotor drives for the mixers constructed according to the present invention and adapted to carry out the method of the present invention.
Figure 2:
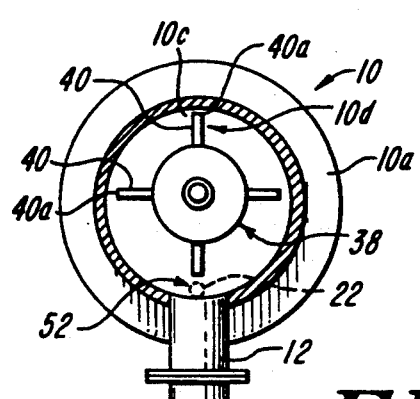
FIG. 2 is a view in vertical section of one of the reaction tubes shown in FIG. 1 illustrating the construction of the mixer and its location with respect to the interior of the reaction tank taken along the line 2—2 in FIG. 1.

FIGS. 1 and 2 show a set of three reaction tanks 10, 10 and 10' arranged vertically, one above the other, and connected in series as a stabilization reactor 72 to process a flow of waste water sludge which has been prethickened to contain approximately 3% to 8% dry solid content. The sludge is fed to the lowest tank 10 through an inlet conduit 12 and exits the three series-coupled tanks via an outlet conduit 14 associated with the uppermost reaction tank 10'. As shown, each reaction tank 10,10,10' preferably has a cylindrical side wall which produces a generally circular cross-section. The longitudinal axis of each tank 10,10,10' extends generally horizontally from a first end wall 10a to a second end wall 10b. Because of this preferred, tube like configuration, the reaction tanks will sometimes be referred to hereinbelow as reactor tubes. Each tube 10, 10, 10' is preferably formed of stainless steel to resist corrosion by the acids and other chemicals used to stabilize the sludge. By way of illustration, but not of limitation, the tubes extend horizontally approximately five feet with a diameter of approximately 20 inches.

As shown, each reactor tube 10,10' has an inlet 12 and an outlet 14 formed by a flanged pipe welded or otherwise mounted on the side wall and open to the interior of the associated reactor tube. The inlets and outlets of each tube are located at opposite ends of the tube. As shown, the lowest reactor tube 10 has its inlet 12 located at its lower right hand side adjacent the side wall 10a, and its outlet 14 is open to the uppermost portion of the tube 10 adjacent its left hand side wall 10b. To achieve the aforementioned series coupling of the three tubes, the inlet 12 of the middle reactor tube 10 is coupled directly to the outlet 14 of the lowest tube 10, and the outlet 14 of the middle tube is at its upper right. This outlet is in turn coupled directly to the inlet 12 of the upper reactor tube 10'. However, the outlet of this upper tube is located adjacent the opposite end wall from the inlet, but at the bottom side of the reactor tube, not the top. A vent 16 is located at the upper surface of the upper tube 10' to release accumulated gases from the stabilization reactor 72.

A liquid oxygen supply 18 and an ozone generator 20 (FIG. 3) provide flows of oxygen gas and ozone gas to each of the three reactor tubes via sparqers 22 located in each tank and directly over the sludge inlet 12 for that tube. With the series-connected arrangement shown in FIGS. 1-3, preferably oxygen and ozone are supplied to the lowest tube 10, but only oxygen is supplied to the middle tube 10 and the upper tube 10'. Alternatively, or in addition to the sparqers 22 located within each reaction tank, a large porous metallic tube sparger 24 can be located in a vertical inlet conduit extension pipe 26 coupled to the inlet 12 of the lower reactor tube 10. The spargers provide a supply of microscopic bubbles of oxygen and ozone which diffuse into the sludge as it flows through each inlet 12 into the tubes 10 and 10'. A metering pump 28 (FIG. 3) supplies a regulated infeed of prethickened sludge to the lowermost inlet 12 via pipe 30 which feeds the vertical inlet extension pipe 26, which in turn feeds the first flanged inlet 12 in the series. A pressure controlling valve 32 regulates the outflow of stabilized sludge from the reactor tube 10' so as to maintain a preselected hyperbaric pressure within the reactor tube, preferably in the range of 3-8 bars. A pressure transducer 33 that senses the sludge pressure within the tube 10' produces a control signal for the valve 32.

A principal feature of the present invention is an in built mixer 34 located within each of the reactor tubes. The mixer in its preferred form includes a central rotatable shaft 38 and four equiangularly spaced plates 40 mounted on the shaft 38 that are each directed radially outwardly from the shaft and extend from the shaft to an outer edge 40a. The radial dimension of each plate is such that it is closely spaced from the upper interior surface 10c of the reactor tube when the plate is in a vertical and upwardly extending position. Each plate is preferably formed of a plastic material having sufficient structural strength to mix the prethickened sludge and formed of a material which is substantially impervious to the chemical environment found within the reactor tubes. One quarter inch thick plates of plastic or stainless steel are suitable.

As shown in FIG. 1, each plate 40 extends to substantially fill the interior volume of the associated reactor tube when viewed in vertical section taken through the plate when the plate is in its vertical upright position. This ensures that there are substantially no dead spaces within the reactor tube where the sludge can avoid being mixed by the plates. Each plate contains a series of openings 42 which allow the sludge held in the container in the reactor tube 10 to pass through the plate with a squeezing action which produces a intensive mixing of the sludge and the microscopic oxygen and ozone bubbles diffused within the sludge.

In the preferred form shown, the mixer is mounted within each reactor tube for rotational motion about the shaft 38 supported in bearings 44 carried in the end walls of the associated reactor tube. Seals 46 also located at each end wall block any leakage of the sludge to the bearings or the exterior of the reactor tubes. As shown, each mixer is preferably driven by a separate, dedicated gearmotor 48 which drives the mixer in a continuous rotating motion with a suitable power reduction set by the gear ratio between the motor and the mating gear 50 supported on a portion of the shaft 38 projecting outwardly from the side wall 10a of each reactor tube. The gearmotors 48 preferably operate at 100 to 1,000 rpm and the mixer preferably rotates at 100 to 200 rpm.

As is also best seen in FIGS. 1 and 2, it is significant that the mixer is mounted eccentrically within the reactor tube, that is, with the center of rotation laterally centered but displaced vertically upward from the center line of the reactor tube, as is best seen in FIG. 2. Because the interior of the reactor tube is generally circular, and because the mixer is generally symmetric with each plate 42 having equal radial dimension from the axis of rotation of the mixer, there is a spacing 52 at the bottom portion of each reactor tube between the outer edge 40a of the plates 40 and the adjacent lower interior surface of the circular side wall of the reactor tube when the plates are in a vertical and downwardly oriented position. The spacing provides a clearance which allows the positioning of the sparger 22 inside the tube without interfering with the rotation of the mixer. More importantly, this ensures that the plates 42 carry the sludge, which substantially completely fills each of the reactor tubes, through the uppermost portion 10d of the interior of each reactor tube where the oxygen and ozone gases would otherwise tend to accumulate and not interact with the sludge.

FIG. 4 shows three reactor tubes 10 of the same construction as described above with respect to FIGS. 1 and 2, but connected in parallel, not in series. Like parts have the same reference numbers. This stabilization reactor can process a larger volume of sludge in a given amount of time than the series arrangement shown in FIGS. 1-3, but the reaction time is shorter and therefore it is suitable only where a shorter reaction time will nevertheless be sufficient to treat the sludge. It should also be noted that the parallel-connected tubes 10 do not need to be in a vertical array, as is the case with the series connected arrangement.

The foregoing apparatus provides sludge stabilization with several quite distinct differences from the prior art arrangements described in the aforementioned Edwards and Lynch et al. U.S. patents. First, with respect to the size of the reaction vessels, the present invention allows the reaction vessel to be approximately ¼ the size of the reaction vessel of Edwards or Lynch et al. when used to process what is initially a comparable volume of sludge. One reason is that in Edwards and Lynch half of the vessel is open to provide a space where the sprayed sludge can interact with the oxygen and ozone gases (an accumulated pool of liquid sludge occupies the bottom half of the vessel). In contrast, in the present invention the sludge fills substantially all of the reaction chamber thereby providing, in general, a reduction of 50% in the volume reactor vessel. Second, because the present invention is capable of operating on a thickened sludge and does not require spraying the sludge in a liquid state, there is at least another 50% reduction due to the increase of the dry solid content of the sludge, from a typical value of 1.5% for liquid phase treatment as in Edwards and Lynch et al., to the prethickened phase treatment of the present invention where the sludge has a solid content of at least 3%. Further, in Edwards and Lynch et al. the contact surface between the comparatively large sludge droplet and the surrounding oxygen or ozone held in the upper half of the container vessels is comparatively small. Consequently the liquid sludge in the prior art system must be recycled and resprayed multiple times to provide a sufficient reaction time to achieve the necessary stabilization. In contrast, applicant uses a intensive, mechanical intermixing to work millions of microscopic bubbles of the oxygen and ozone gas through the prethickened sludge. This provides a much better contact surface for a interaction between the gas and the sludge and a corresponding reduction in the reaction time necessary to achieve stabilization. For most applications, with the present invention it is possible to achieve a stabilization of the sludge with a reaction time of only 15-45 minutes as compared to 90 minutes for one of the prior art patents and successive reaction periods of 15-60 minutes for each of two stages of reaction of the vessels in the Lynch et al. system.

With reference to FIG. 3, there is depicted in schematic form a complete sludge stabilizing and thickening system which takes as an input the sludge produced by a conventional municipal waste water treatment facility, such as the sludge from a settling tank or a flotation type clarifier such as the one manufactured by the Krofta Engineering Corporation under the trade designation Supracell, and produces a substantially dry, biologically inactive, and metal-free sludge with a dry solid content in the range of 20% to 40%. Sludge with this low water content is suitable for transportation by a truck 54, as shown, by railroad cars, by any conventional refuse container, or for use on site as a fuel, whether directly or to be gasified to fuel a diesel engine or the like to produce electricity.

Sludge from the flotation clarifier or primary and secondary settling tanks (which has been mixed together in an equalization tank) enters the sludge stabilization system through a pipe 56 and is pumped through a regulating valve 58 to a mixing tank 60 where a conventional polymer is added as indicated at 62. The overflow from the mixer 60, a watery sludge with mixed in polymer, is directed through an overflow 64 to a primary thickening apparatus 66 of conventional design. The thickener 66 can, for example, be of the screen thickener type or a flotation thickener. In any event, the primary thickener 66 reduces the water content of the sludge to a desired prethickened value of a dry solid content in the range of approximately 3% to 8%. The water removed at the primary thickener 66 is preferably partially recycled for use in cleaning showers.

The prethickened sludge, as indicated by an arrow 68, is then directed into a second mixing tank 70 where acid is added, as indicated at 72, to lower the pH level of the sludge to remove heavy metals from it. The metering pump 28, preferably a positive displacement type pump, pumps the acidified and prethickened sludge from the tank 70 into the stabilization reactor 72 formed by three series connected reactor tubes 10, 10, and 10' operating as described above with respect to FIGS. 1 and 2. The metering pump 28 presets the flow rate of thickened sludge into the stabilization reactor 72. A level sensor 74 associated with the second mixing tank 70 produces an output signal which controls the inlet flow regulating valve 58. As a result, the thickening and pH control processes provided by first and second mixing tanks 60 and 70 and the primary thickener 66 can operate independently of the need to feed the stabilization reactor 72.

The stabilization reactor operates in a manner described above. The vent 16 can release excess gas directly to the atmosphere, or it can be directed to a compressor (not shown) and recycled back into the lower tank 10 of the stabilization reactor 72. Treated sludge discharged at the outlet 14 from the upper reactor tube 10' exits through a conduit 76 connected to the outlet 14 of the reactor tube 10'. The flow regulating valve 32 is installed in the conduit 76. The treated sludge, indicated by the arrows 68', is then directed to a second thickening device 78 such as a twin belt press which reduces the liquid content of the sludge to the desired final dry content value of approximately 20% to 40%. The water removed from the sludge by the belt press 78, as indicated by the arrow 80, is returned to the inlet of the sewerage plant. The final dried and treated sludge 68" has a water content roughly equivalent to that of a dry apple. It has a BTU value comparable to that of wood, and therefore it is a good fuel.

While the present invention has been described with respect to its preferred embodiments, it will be understood that various modifications and alterations will occur to those skilled in the art from the foregoing detailed descriptions and the accompanying drawings. For example, while the stabilization reactor has been described as a unit using three reactor tubes of a particular size and configuration, the number of tubes can be one, two, three, or more and that the size and configuration of the reactor tanks 10,10' may be changed without departing from the scope of the present invention. For example, the cross sectional configuration of the tank can be other than circular provided that sufficient diffusion and intensive mixing of the sludge and dissolved microscopic gas bubbles occurs to stabilize the sludge. Similarly, while a preferred form of rotating mixer has been described, it will be understood that an intensive mechanical mixing of the sludge and diffused gas bubbles can be achieved using other, although perhaps more costly or less efficient, mixing arrangements. For example, the mixer can be formed with sets of spaced apart vanes, rather than solid plates with simple circular openings, to produce the desired mixing. The mixer could also operate with a screw type impeller, or even operate with a linear or rotating reciprocating motion, as opposed to the continuous rotational motion produced by the gearmotors 48. Also, while the invention has been described in its preferred form with a paddle-like rotating mixer which sweeps the sludge through the uppermost portions of the tanks interior with a clearance at the bottom, it is not absolutely essential that the mixer be in an extremely close, wiping relationship with the upper interior surface of the tank, nor is it necessarily essential that the mixer have a clearance between its operating members and the lower interior surface of the tank, particularly if oxygen and ozone are diffused into the sludge via a sparqer located in the inlet conduit 12, rather than directly inside the tanks 10, 10'. It will be understood, also, that while the invention has been described with respect to a metering pump and pressure regulating valve controlling the flow of sludge and its pressure in the stabilization reactor, there are other known arrangements for controlling flow and pressure, although perhaps not as efficient and reliable as the arrangement described hereinabove.

Those and other variations and modifications are intended to fall within the scope of the appended claims.

What is claimed is:

1. A method for stabilizing sludge such as that produced in a municipal waste water treatment plant comprising the steps of:
   prethickening the sludge to a solid content in the range of approximately 3% to 8%.
   continuously feeding the sludge to fill substantially at least one hollow reactor tank;
   introducing microscopic bubbles of $O_2$ and/or $O_3$ directly into the sludge in the tank,
   mechanically mixing the sludge and bubbles within the tank until the sludge is fully stabilized,
   said mixing carrying said sludge to the upper portion of the interior of said tank where said bubbles tend to accumulate, and
   withdrawing stabilized sludge from the tank at a controlled rate.

2. The method of claim 1 further comprising the step of acidifying the sludge to remove heavy metals.

3. The method of claim 1 or 2 wherein said withdrawing and said feeding are at a rate to maintain a hyperbaric pressure within the tank.

4. The method of claim 1 wherein said mixing is eccentric with respect to the interior of said tank.

5. The method of claim 1 further comprising the step of thickening the sludge to a solid content in the range of 20% to 40%.

6. The method of claim 1 further comprising repeating in series the steps of feeding, introducing and mixing.

7. The method of claim 2 further comprising the step of positioning said feeding and said withdrawing at opposite ends of said tank.

* * * * *